Patented Jan. 21, 1947

2,414,438

UNITED STATES PATENT OFFICE 2,414,438

ELECTRODEPOSITION OF SELENIUM

Mortimer C. Bloom, Newton Highlands, Mass., assignor, by mesne assignments, to Federal Telephone and Radio Corporation, New York, N. Y., a corporation of Delaware No Drawing. Application December 1, 1942,
Serial No. 467,562

4 Claims. (Cl. 204—56)

This invention relates to the electro-deposition of selenium and has for its object to provide a method of depositing metallic selenium evenly in a pure form and without the use of corrosive solutions.

Another object is to attain an even and fine grained selenium deposit on a base element which will be useful for a rectifier or photocell.

Selenium has heretofore been electro-deposited cathodically by the use of solutions producing quadrivalent selenium cations ($Se^{+4}$). Such a condition is had in a selenious acid solution containing an excess of acid as disclosed and claimed in copending application Ser. No. 420,906, filed November 29, 1941, of which I am a joint inventor. In the use of that method the $Se^{+4}$ ions carry the selenium to the cathode, depositing it there in metallic form. Unless the proper plating conditions are maintained, the base plate or element on which selenium is deposited by the cathodic method may sometimes become corroded by the acid of the solution, and sometimes the selenium deposit is pitted by hydrogen released at the cathode from the acid.

In accordance with my present invention, I electro-deposit metallic selenium on an anode in a non-acid solution having anions containing selenium in the negative valence, thereby avoiding the tendency toward corrosion and pitting sometimes encountered in an acid solution. My invention is practiced by immersing a conductive element as an anode in such a solution. The cathode preferably contains selenium which can pass into the solution to replenish that used up in the electro-deposition on the anode.

I have found that the selenides meet the requirements for the solution. The selenides of sodium, potassium or ammonia and also of the less common alkali elements, such as lithium, rubidium and caesium may be used, as well as alkaline selenides formed from the alkaline earth group. Sodium selenide ($Na_2Se$) is easily and cheaply obtainable for the purpose. This can be prepared by passing the gas $H_2Se$ through a sodium hydroxide (NaOH) solution. The sodium hydroxide solution may be of practically any strength. A concentration of 100 grams of sodium hydroxide per liter of solution has been found satisfactory; and both double this concentration and half this concentration have also been found satisfactory. These concentrations are not critical. The amount of gas passed through is not critical but preferably there should be used enough gas to saturate or nearly saturate the solution with the gas.

Another way of preparing the solution is to dissolve powdered selenium in a solution of sodium hydroxide. This will form the desired sodium selenide ($Na_2Se^{-2}$). It will form, in addition, sodium selenite ($Na_2Se^{+4}O_3$) which is useless for the purpose of anodic plating as the $+4$ ions will pass to the cathode rather than the anode. Consequently, it is preferred to use a solution containing only the desired selenide and not the selenite; and the selenide free from the selenite can be had by the method of treating with the gas $H_2Se$.

For the anode almost any conducting plate or element may be used, for example, platinum and nickel. Deposits on carbon are even more adherent. For the cathode almost any conductor can be used although one should be selected which is non-reactive with the solution. Cathodes of platinum and carbon have been found satisfactory; and a mixture of carbon and selenium is even better as the selenium in it will tend to replenish the solution.

The current density through the solution is not very critical; and in general, the higher the current the shorter is the time needed for a deposit. It is preferable however not to use excessive currents, in order to avoid the evolution of oxygen. A current density of 10 amperes per square foot of anode surface has been found satisfactory and a good deposit will be obtained in about twenty minutes at this density.

The selenium deposits thus obtained can be made fine-grained and will be free from all impurities which do not deposit anodically, and also from impurities which do deposit anodically but only at different voltage and current levels from that being used. As the selenide solutions are non-acid they will not tend to corrode ordinary base elements used as the anode; and there will be an absence of pitting of the selenium deposit.

The selenium thus obtained may be scraped off and used for purposes requiring a pure selenium. On the other hand, the deposit is uniform and fine-grained so that it can be used as deposited on the anode in a selenium rectifier or photocell. A counterelectrode may be applied to the selenium as by spraying the surface with Wood's metal in a well-known manner.

What is claimed is:

1. In a process for forming an adherent fine grained coating of metallic selenium upon an electro-conductor surface, the step that comprises electro-depositing the metallic selenium upon said electro-conductor as the anode of a pair of electrodes in an aqueous alkaline solution that comprises essentially a selenide selected from the class consisting of ammonium, alkali metal, and alkaline earth metal selenides.

2. In a process for forming an adherent fine grained coating of metallic selenium upon an electro-conductor surface, the step that comprises electro-depositing the metallic selenium upon said eelctro-conductor as the anode of a pair of electrodes in an aqueous alkaline solution comprising essentially sodium selenide.

3. In a process for forming an adherent fine grained coating of metallic selenium upon an electro-conductor surface, the step that comprises electro-depositing the metallic selenium upon said electro-conductor as the anode of a pair of electrodes in an aqueous alkaline solution comprising essentially potassium selenide.

4. In a process for forming an adherent fine grained coating of metallic selenium upon an electro-conductor surface, the step that comprise electro-depositing the metallic selenium upon said electro-conductor as the anode of a pair of electrodes in an aqueous alkaline solution comprising essentially ammonium selenide.

MORTIMER C. BLOOM.